Patented Oct. 16, 1951

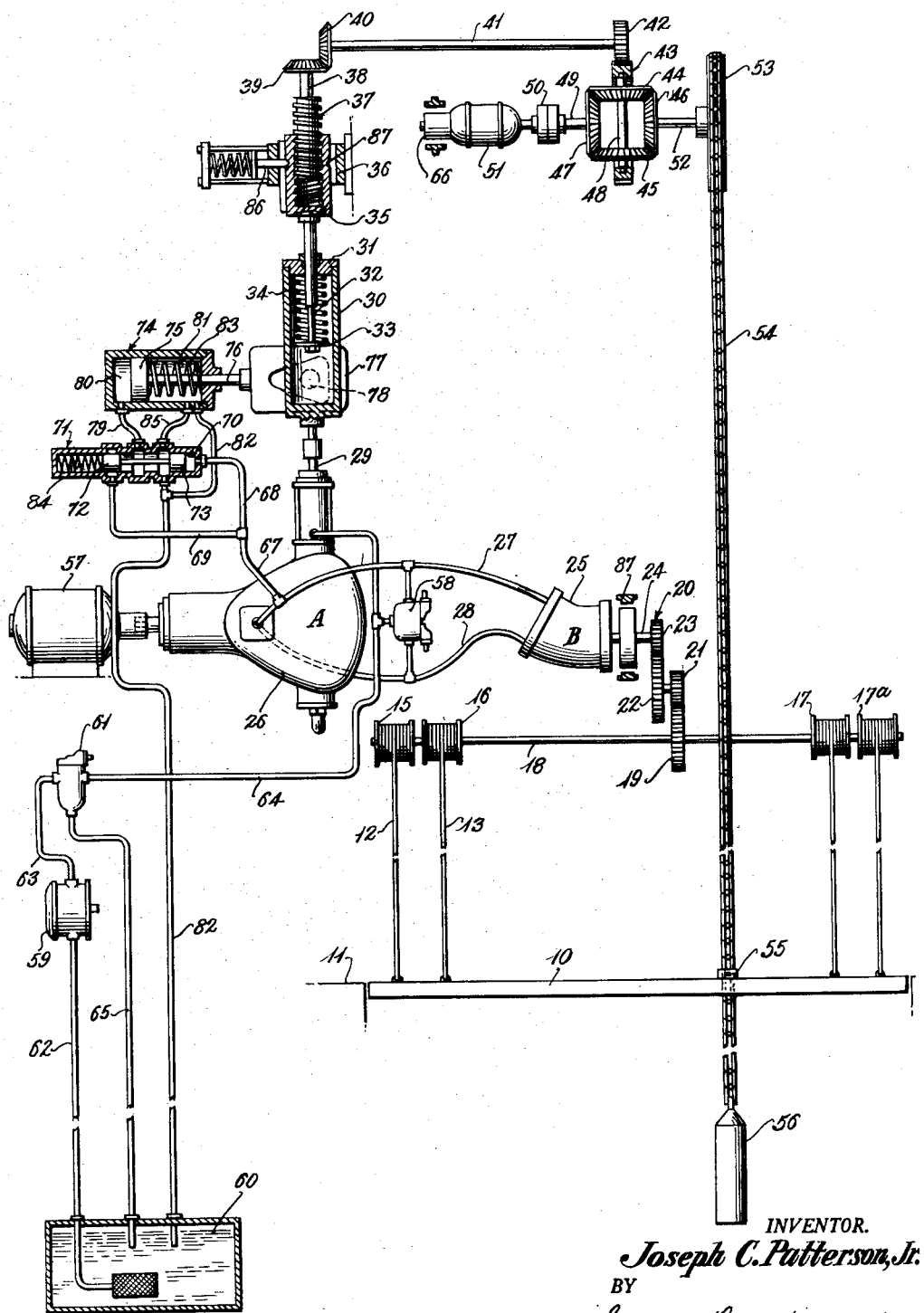

2,571,480

UNITED STATES PATENT OFFICE 2,571,480

CONTROL APPARATUS

Joseph C. Patterson, Jr., Washington, D. C.

Application December 31, 1948, Serial No. 68,592

6 Claims. (Cl. 60—53)

This invention relates to a control system and in particular to a system for controlling a transmission interposed between a motor and a load in such a way as to provide for the starting, stopping and accommodation in movement of loads of varying magnitude by a motor or other power supply of substantially fixed horsepower capacity.

In naval vessels, particularly aircraft carriers, elevators are rather widely used for the movement of aircraft to and from the flight deck and between various storage decks as well as for the movement of bombs or other ammunition from positions of storage to the loading position. In view of the fact that these elevators are required at some times to operate empty and at other times under very severe load, it has been the past practice to provide an electric motor for each elevator specially designed to be capable of handling the range of anticipated loads of the particular elevator which it operates. This expedient required the design, installation and maintenance of a large number of special power motors, a different one for each size elevator. Accordingly, under conditions of operation a carrier heretofore had to be equipped with a large number of repair parts suitable for each of the specially designed motors. Furthermore, the electric motor design is complicated by the fact that it has to be explosionproof against gasoline vapors. Otherwise different but equally expensive special precautions are required such as the installation of airtight machinery rooms. An additional factor complicating the power requirements for elevators on aircraft carriers is the matter of accommodating the starting and stopping of the elevator by an electric motor. If the motor is designed to start and stop the load, then it must withstand the high starting and decelerating current which requires special consideration of the duty cycle in each case. On the other hand, if a clutch is used between the motor and the elevator, severe difficulties are encountered in spotting the elevator platform at any particular stopping point.

It is an object of this invention to overcome the foregoing disadvantages and to provide a hydraulic transmission between a motor of standard design and a load such as an elevator, which transmission is controlled to start, stop and accommodate in movement loads of varying capacity without requiring that the motor be stopped and without introducing problems incident to the spotting of the elevator or load at any particular level.

This invention contemplates an arrangement in which any of a large group of elevators of different sizes can be operated over a wide range of load conditions by a standardized motor and transmission, a number of units of which can be installed at the appropriate positions in the ship.

It is also an objective of this invention to provide a control system adapted for installation between an elevator or in fact any load and a motor, the control providing substantially constant horsepower output as the transmission is operated automatically in response to the magnitude of the load and the movement thereof.

It is contemplated according to the present invention that the transmissions for all installations in any particular ship be the same so that interchangeability of parts is extended not only to the motor units themselves but also to the transmissions.

Other objects and advantages of this invention will be apparent upon consideration of the following detailed description of an embodiment thereof in conjunction with the annexed drawings wherein the single figure is a schematic view of a typical assembly according to the present invention.

Referring now to the drawing in greater detail, the numeral 10 designates diagrammatically an elevator which is to be moved from a position 11 to any of a group of higher or lower positions not shown. The elevator is operated by cables 12, 13 and 14 which are reeled in or payed out by drums 15, 16, 17 and 17a, respectively, connected to a shaft 18 which is driven through a gear 19 from a gear train 20. The gear train 20 includes a driving pinion 21 on the same shaft as a gear 22 which meshes with a gear 23 connected to the output shaft 24 of a "B" end brake which in turn is connected to the shaft of a hydraulic transmission. It is now apparent that as the B unit of the transmission is rotated, the shaft 24 will rotate and, through gears 23, 22, 21 and 19, will drive the shaft 18 to rotate the drums 15, 16, 17 and 17a to reel in or pay out the cables 12, 13 and 14, according to the direction of rotation of the shaft 24. In view of the relative size of the gears 23, 22 and 21 and 19, a measure of mechanical advantage is afforded between the shaft 24 and the shaft 18.

The transmission illustrated comprises in addition to the B unit 25, an A unit 26 and connecting conduits 27 and 28. While various types of hydraulic transmissions might be suitable in some installations, the one shown in the drawing is of the type involving a tilt plate in the A end, the rotation of which causes the reciprocation of pistons which displace the working liquid to the B end where pistons are displaced by it to cause rotation of shaft 24. In this type of transmission it is common to have an adjustable tilt plate so that the stroke of the pistons is adjustable and consequently the fluid output from the A end is adjustable per revolution of the tilt plate. Examples of such transmissions are shown in Patent No. 924,787 issued to Reynold Janney, June 15, 1909, and Re. 20,551 issued to W. E. Rouse, November 9, 1937.

It is the variable stroke property of the A unit 26 which is utilized in effecting the control which constitutes an important phase of this invention. Projecting above the A end 26 of the transmission is a control rod 29, vertical displacement of which results in adjustment of the tilt plate to accomplish the purposes set forth above. This adjusting rod is connected to a hollow cylinder 30 which is provided with a cap 31. Through the cap 31 a rod 32 projects into the interior of the cylinder 30 and this rod is provided with a disc 33 marginally connected to a coil spring 34 extending between the disc 33 and the interior face of the cap 31. The coil spring 34 is also connected to the cap 31. Rod 32 is connected to an internal threaded housing 35 which is rigidly mounted for vertical reciprocation in guide bearings 36. A screw 37 is received in the housing 35 and is connected through a shaft 38 to a bevel gear 39. Bevel gear 39 meshes with another bevel gear 40 which is mounted at one end of a shaft 41. The other end of the shaft 41 is provided with a pinion 42 which meshes with a ring gear 43 constituting the output unit or element of a differential gearing system comprised of gears 44, 45, 46 and 47. The gears 44 and 45 are bodily fixed relative to the ring gear 43 and to this end are mounted for rotation on a supporting shaft 48 which is anchored in the ring gear. The gear 47 constitutes the input to the differential system and that gear, through a shaft 49 and a coupling 50, is connected to a torque motor 51. The other input gear 46 to the transmission is connected through a shaft 52 to a sprocket wheel 53 which receives thereover a chain 54, one end of which is anchored at 55 to the elevator platform 10, and the other end of which is attached to a counterweight 56.

The A end 26 of the transmission is connected to a driving motor 57 and the usual relief valve 58 is provided between the feed and return lines 27 and 28 connecting the A end 26 with the B end 25. In order to make up for fluid losses in the system, a small replenishing pump 59 is provided which delivers working liquid from a storage tank 60 to a valve 61 through conduits 62 and 63. Valve 61 provides a constant low pressure on line 64 therefore if makeup liquid is required in the system, the liquid will be supplied through a conduit 64 to the low pressure side through check valves in valve body 58. On the other hand, if no liquid is required, valve 61 will shunt the liquid through conduit 65 back to the storage tank 60. Pump 59 and valve 61 also provide control pressure for the standard servo-control on A end of hydraulic transmission.

If now it is desired to operate the platform 10, the motor 57 is started in the appropriate direction with the tilt plate in the A end 26 at the neutral or no stroke position and a brake 87 is set to hold. Under these conditions motor 57 has practically no starting load. When now the platform 10 is to be moved, motor 51 is energized to cause gear 47 to turn. Since gear 46, through the chain and sprocket arrangement, is attached to the load, that gear is stationary so that gears 44 and 45 are driven about the gear 46, causing rotation of the ring gear 43. The rotation of the ring gear 43 through pinion 42 and bevel gears 39 and 40 operates the screw 37 to raise the adjusting shaft 29 or, otherwise expressed, to shorten the distance between the top of the shaft 29 and the plane of the bevel gear 39. This action begins to adjust the tilt plate of the A end 26 which in turn starts the operation of B end 25, which, through the gear train 20 and the drums and cables, starts the movement of the elevator. Brake 87 is automatically controlled electrically and is interlocked so that it is released when the A end 26 is stroked "off neutral" in either direction. The brake automatically sets and holds every time the A comes back to neutral. As the platform 10 moves, counterweight 56 keeps the chain 54 tight and the resulting movement of the chain relative to the gear 46 causes that gear to turn. As the gear 46 begins to move, the speed differential between gears 47 and 48 is reduced and the speed of rotation of the output ring gear 43 is correspondingly reduced. The rotation of gear 43 is not stopped, however, until gears 46 and 47 are rotating at the same speed and this condition cannot be achieved until the A end 26 is fully opened. When the A end 26 is fully opened, the torque motor 51, which is of such a size as to be wholly incapable of handling the load of the platform 10, can only follow the rotation of the gear 46 and thus keep gear 47 moving at the same rate as gear 46, it being apparent that the A end 26, once fully opened, is not susceptible of further movement. A motor of these characteristics is ordinarily defined in the engineering profession as a motor of drooping speed-torque characteristics. In other words, when it can actuate a load it moves at a speed from slow speed up to its design maximum speed whatever load conditions permit. Here the motor 51 can handle the job of operating the tilt plate and cannot handle the operation of even the unloaded elevator. Accordingly, as the elevator moves, the speed of the motor 51 drops off to follow the speed of the gear 46. In the event of mechanical stoppage which prevented the elevator from moving, the motor 51 would stall with the A end on full stroke and it is designed in such a way as not to burn out when stalled for predetermined periods of time as required by the application. In the event of a mechanical failure such as set out above, relief valve 58 will by-pass the oil between lines 27 and 28 and prevent damage to the hydraulic system.

This condition prevails until the elevator approaches the level at which it is to be stopped. At that point, motor 51 is stopped and is held by a brake 66 or by other non-overhauling means. Since the stoppage occurs while the B end 25 is still driving, it is apparent that the starting cycle is reversed, for now gear 47 is held stationary while gear 46 continues to turn. However, since gears 46 and 47 turn in opposite directions, the ring gear will now turn in such a way as to move the screw 37 to close the A end 26 or to restore it to zero tilt.

It will be noted that by the foregoing expedient the motor 57 is entirely free of stopping and starting with the elevator. Furthermore, by attaching the chain 54 directly to the elevator, the control can be rendered accurate since such items as backlash in gearing and elevator cable stretch are eliminated. In fact, it is only by the elimination of these factors that it is possible to predetermine where motor 51 should be cut off in advance of the stopping position of the platform 10. Conventional elevator practice will be adopted in permitting the platform 10 to operate the switch which shuts off motor 51 and sets the brake 66.

In the foregoing description it has been assumed that the load imposed on the platform 10 will be a normal one. Conditions may arise, however, when the load is in excess of normal such that the A end 26, if set at full stroke, would overload the motor 51. To avoid this condition, the high pressure line 27 between the A end 26 and the B end 25 of the transmission is tapped by a line 67 which branches into lines 68 and 69 which enter the cylinder 70 of a piston valve arrangement generally indicated at 71. The piston of the valve 71 comprises two elements 72 and 73 which control the flow of working liquid to and from the working space of a piston and cylinder unit 74, the piston 75 of which is connected through a rod 76 to a cam 77 coacting with a pin 78 projecting from the housing 30 and functioning as a follower. In the drawing, the units 71 and 74 and the pin 78 are shown in the starting position or zero tilt position of the A end 26. As the tilt plate is opened to produce stroke on the pistons of the A end 26, the pin 78 is raised from the position shown in the drawing to a position near or touching the upper edge of the cam. If now excessive pressure exists in line 27, piston 73 is moved to the left of the position shown in the drawing whereby line 69 is placed in communication with a line 79 leading to the working space 80 of the unit 74. Under these conditions the piston 75 is displaced to the right and leakage liquid from the space 81 is returned through a line 82 to the liquid storage tank 60. Displacement of the piston 75 causes the upper edge of the cam 77 to bias the pin 78 downwardly and thus reduce the stroke of the A end of the transmission. This reduction in stroke causes the load to be moved more slowly and relieves the horsepower requirements on the motor 51 to some predetermined value. If now the pressure in the line 27 falls to normal, cam 77 will be displaced to the left due to the fact that the spring 83 will displace the piston 75 in that direction. The reason that spring 83 can act is that a drop in pressure in the line 27 permits a spring 84 to restore the pistons 72 and 73 of the unit 71 to the position shown in the drawing. Thus liquid from working space 80 is dispelled through line 79 into the chamber of 70 and out through a line 82 to storage tank 60. Also any leakage oil into spring space 81 is drained through line 85 through 70 to line 82.

While the cam 77 has been shown only diagrammatically, it is apparent that it must operate in a horizontal keyway so that shaft 16 and the piston and cylinder unit 74 will not be in shear. The movement of the cam 77 which may cause movement of the pin 78 is transmitted to the shaft 29 through the spring 34. Since the spring 34 is connected both to the cap 31 and to the disc 33, it serves to transmit both the opening and closing force to the tilt plate of the A end 26. When the cam acts, however, the spring 34 is compressed so that the shaft 32 is not moved vertically but only the cylinder 30 and the shaft 29.

The slope of the working sides of cam 77 can be made to reduce the stroke on A end unit faster during one portion of stroke than another in order to, as an example, reduce the stroke faster when the A end unit is on full stroke than when it is nearing neutral. Also the two working surfaces of the cams can be designed differently to compensate for the difference in hoisting and lowering pressures.

Associated with the threaded housing 35 is a spring-urged pin 86 coacting with an annular groove 87 in the outer surface of the housing 35. The spring-urged pin assembly is mounted for vertical adjustment so that it can hold the tilt plate of the A end 26 in any desired position of adjustment, it being apparent, however, that rotation of the screw 37 can easily overcome the spring force acting on the pin 86 to change the adjustment. The purpose in having a spring lock to hold the A end in a position of adjustment is to allow the A end to idle at vary low displacement so that the main hydraulic power circuit is kept full. In other words, the adjustment allows that A end to be on slight stroke to make up for leakage that may exist during periods when the load is stationary. Even with the B end brake 87 set hydraulic oil leakage occurs so that with the A end on slight stroke the hydraulic working circuit is kept full and ready for instant use. By rendering the locking pin 86 vertically adjustable, the locking position may be predetermined.

While this invention has been described with reference to a ship elevator such as a bomb elevator, it is perfectly apparent that the apparatus described is capable of use in the starting, stopping and handling of various types of loads not necessarily of the elevator type.

What is claimed is:

1. Control apparatus including a load, a motor, an adjustable transmission between said load and motor, and a differential system including an input element connected to move with the load, an output element connected to adjust the transmission and another input element, torque supply means of drooping speed characteristics connected in direct driving relation to said other input element of said differential system and a brake for said torque supply means whereby the load may be started by energization of said torque supply means to cause adjustment of the transmission to driving position and the load may be stopped by deenergization of said torque supply means and application of said brake.

2. Control apparatus comprising a load to be moved from one position to another, a hydraulic transmission comprising a driving unit and a driven unit, said driving unit being adjustable from zero output to a maximum output, means connecting the driven unit to the load, a motor connected to the driving unit, a differential gearing system including a pair of input elements and an output element, means connecting the load in driving relation to one of the input elements, means connected to the output element of the differential gearing system for adjusting the output of said driving unit, means to supply torque of drooping speed characteristics connected in direct driving relation to the other input element of the differential gearing system, and a brake associated with said other input element.

3. Control apparatus comprising a load to be moved from one position to another, a hydraulic transmission comprising a driving piston and cylinder unit and a driven piston and cylinder unit, means for adjusting the stroke of the driving piston and cylinder unit, a motor connected in driving relation to said driving unit, means susceptible of lost motion connecting the driven unit to the load, a differential gearing system including a pair of input elements and an output element, means substantially free of lost motion connecting the load in driving relation to one of said input elements, means connecting said output element to adjust the stroke of said driving piston and cylinder unit, a torque motor of drooping speed characteristics connected in direct driving relation to the other input element of the differential gearing system, and a brake associated with said other element whereby in stopping the load the torque motor is shut off and the brake is applied to cause the load through the differential gearing system to adjust the stroke of the driving piston and cylinder unit to zero in response to a predetermined movement.

4. Control apparatus comprising a load to be moved from one position to another, a hydraulic transmission comprising a driving piston and cylinder unit and a driven piston and cylinder unit, a motor connected in driving relation to said driving unit, means for adjusting the stroke of the driving piston and cylinder unit, means connecting the driven unit to the load, a motor of substantially constant horsepower connected to said driving unit, a differential gearing system including a pair of input elements and an output element, means connecting the output element of said differential gearing system to the stroke adjusting means, means connecting the load in driving relation to one of the input elements, a torque motor of drooping speed characteristics connected in direct driving relation to the other of the input elements, a brake for acting on said other input element and means responsive to a predetermined working fluid pressure in said driving unit to modify the adjustment imposed upon the adjusting means by the output element of the differential gearing system.

5. Control apparatus including a load, a motor, a hydraulic transmission between said load and motor, said transmission being adjustable from zero output to a maximum output, an adjusting member for adjusting said transmission, a connecting rod comprised of telescoping elements normally resiliently biased to a predetermined relative position, a differential gearing system including two input elements and an output element, one of the telescoping elements being adjustable as to length, means connecting the output element of said differential gearing system to the adjustable telescoping element to adjust its effective length, the other of said telescoping elements being connected to said adjusting member, means connecting one of the input elements of the differential gearing system to the load, a torque motor of drooping speed characteristics connected to the other input element of the differential system, a cam acting on the telescoping element connected to said adjusting member to modify the normal relative position of the telescoping elements and pressure responsive means for moving said cam in response to a predetermined pressure in said transmission.

6. Control apparatus including a load, a motor, a hydraulic transmission between said load and motor, said transmission being adjustable from zero output to a maximum output, an adjusting member for adjusting said transmission, a connecting rod comprised of telescoping elements normally resiliently biased to a predetermined relative position, a differential gearing system including two input elements and an output element, one of the telescoping elements including a screw jack, means connecting the output element of said differential gearing system to operate the screw jack to adjust the effective length of the respective element, the other end of said telescoping elements being connected to said adjusting member, means connecting one of the input elements of the differential gearing system to the load, a torque motor of drooping speed characteristics connected to the other input element of the differential system, a cam acting on the telescoping element connected to said adjusting member to modify the normal relative position of the telescoping elements and means responsive to variation from a normal pressure range in said transmission for moving said cam.

JOSEPH C. PATTERSON, JR.

REFERENCES CITED

The following references are of record in the file of this patent:

UNITED STATES PATENTS

| Number | Name | Date |
| --- | --- | --- |
| 654,656 | Lindstrom et al. | July 31, 1900 |
| 1,159,612 | Sundh | Nov. 9, 1915 |
| 2,069,230 | Ferris | Feb. 2, 1937 |